United States Patent [19]
Iwata

[11] Patent Number: 4,730,865
[45] Date of Patent: Mar. 15, 1988

[54] ASSEMBLY FOR SECURING A WINDSHIELD COVER TO A VEHICLE

[76] Inventor: Tadashi Iwata, 2472, Oaza Kanogami, Kano-cho, Tsuno-gun, Yamaguchi-ken, Japan

[21] Appl. No.: 947,815

[22] Filed: Dec. 30, 1986

[51] Int. Cl.[4] ............ B60J 1/02
[52] U.S. Cl. ............ 296/95 C; 296/97 D; 248/206.5
[58] Field of Search ............ 296/95 C, 97 A, 84 K, 296/84 M, 97 D, 97 R, 95 Q; 248/206.5, 500

[56] References Cited

U.S. PATENT DOCUMENTS 2,649,330 8/1953 Schamel et al. ............ 296/95 C

FOREIGN PATENT DOCUMENTS 232656 5/1959 Australia ............ 296/95 C
2258388 5/1974 Fed. Rep. of Germany .... 296/95 C
2432651 1/1976 Fed. Rep. of Germany .... 296/95 C
1426285 12/1965 France ............ 296/95 C
2539681 7/1984 France ............ 296/95 Q
376009 4/1964 Switzerland ............ 296/95 C

*Primary Examiner*—Robert B. Reeves
*Assistant Examiner*—Carol L. Olson
*Attorney, Agent, or Firm*—Price, Heneveld, Cooper, DeWitt & Litton

[57] ABSTRACT

There is disclosed herein an assembly for detachably securing a windshield cover to windshields of motor vehicles such as passenger cars or tractors, which comprises a plurality of magnetic units including magnetic pieces supported on supporting members, each supporting member having a fixed width and length, and connecting members for pivotally interconnecting the magnetic units, each connecting member having a width equal to or less than the width of each supporting member and a length twice or less longer than the width of each supporting member.

3 Claims, 3 Drawing Figures

5 1 2 12 2 1 4
N S N S
4 1 3 11 1 3 11

ASSEMBLY FOR SECURING A WINDSHIELD COVER TO A VEHICLE

BACKGROUND OF THE INVENTION

This invention is concerned with an assembly for securing a windshield cover to a vehicle body, such assembly being widely usable for various types of vehicles, such as passenger cars, tractors for agricultural use and caterpiller-equipped or wheeled vehicles for construction use.

Although such assembly is suitable for use in various types of vehicles, the present invention will now be described in connection with a passenger car.

In the wintertime and especially at night, if a car is parked outside, rather than in a garage, without laying a windshield cover over the windshield, then frost or moisture may condense and freeze on the windshield in the next morning. This may cause the windshield to become opaque and consequently, make it difficult to drive the car. However, there has never been provided any assembly for securing such a cover to a vehicle body. It is for this reason that most cars are often placed outside without a cover thereover.

SUMMARY OF THE INVENTION

It is, therefore, an object of this invention to provide a novel assembly for detachably securing a windshield cover to a vehicle body.

It is another object of this invention to provide an assembly for readily and detachably securing a windshield cover to a vehicle body without the need to effect any cumbersome work on the vehicle body.

It is a further object of this invention to provide an assembly for securing a windshield cover to a vehicle body, which is compact and can be conveniently kept.

It is still a further object of this invention to provide an assembly for securing a windshield cover to a vehicle body, which can be kept from being stolen.

In order to achieve the foregoing objects, this invention provides an assembly for securing a windshield cover to a vehicle body, such assembly comprising a plurality of magnetic units including magnetic pieces supported on supporting members, each member having a fixed width and length, and connecting members for pivotally interconnecting the magnetic units, each connecting member having a width equal to or less than the width of each supporting member and a length twice or less longer than the width of each supporting member.

According to one aspect of this invention, the magnetic pole of one magnetic unit has a sign different from or opposite to that of the magnetic pole of the adjacent magnetic unit.

Further, one of the magnetic units is connected at its one end with a chain assembly having a suitable engaging member.

The above and further objects, aspects and advantages of this invention will be more apparent from the following detailed description taken in conjunction with the accompanying drawings.

DESCRIPTION OF A PREFERRED EMBODIMENT

Figure 1:
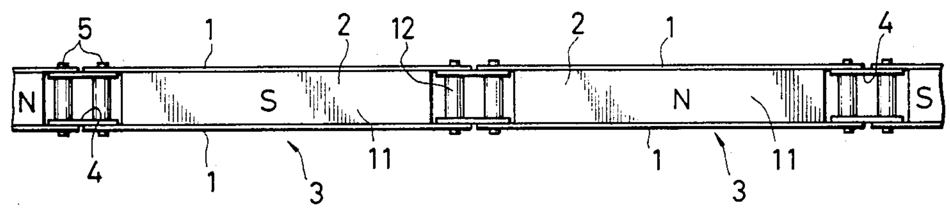
FIG. 1 is a plan view of the assembly according to one embodiment of this invention, such assembly being held in its spread position.
Figure 2:
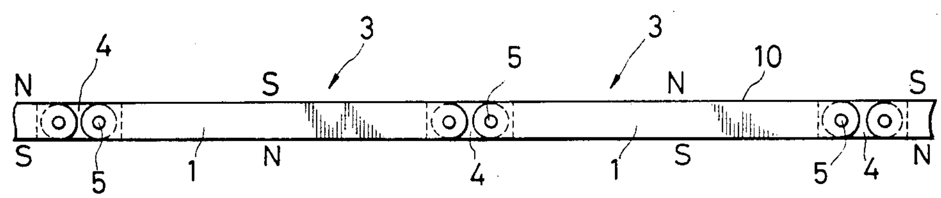
FIG. 2 is a side view of the assembly shown in FIG. 1.
Figure 3:
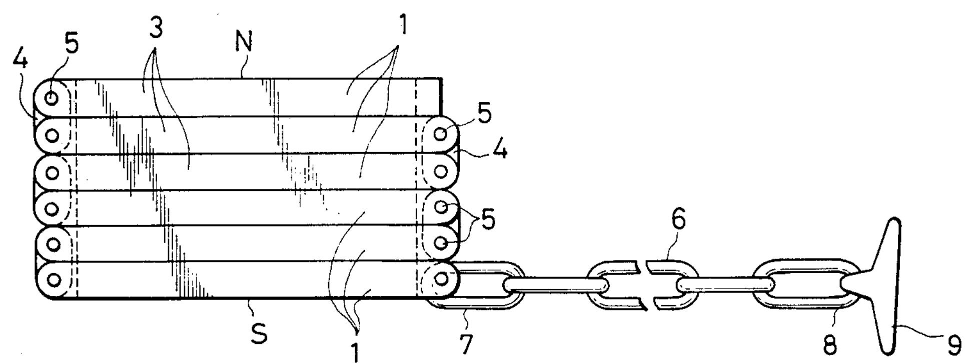
FIG. 3 is a side view of the assembly in its folded position.

With reference to FIGS. 1 through 3, the numeral 1 denotes elongated supporting members for magnetic pieces, each supporting member 1 being in sheet form and preferably made of ferromagnetic materials such as iron. It will be appreciated, however, that other materials such as aluminum, copper or copper/zinc alloy may be used. Alternatively, a metal plate may typically be plated with a chrome coating. Each supporting member 1 has a fixed length and width, and supports the magnetic pieces 2 (FIG. 1). A plurality of magnetic units 3 are best shown in FIG. 3, each unit being typically fabricated in such a manner that one side of the magnetic piece 2 is attached, as by adhesive, on one supporting member and the other side of the magnetic piece 2 is similarly attached on the other supporting member. Alternatively, the supporting members 1 may be assembled in the form of a casing (not shown) in which the magnetic pieces 2 are arranged. The numeral 4 denotes connecting members, each connecting member 4 including two pins 5 by which the magnetic units 3 are pivotally connected. Each connecting member 4 is in sheet form and is most preferably made of ferromagnetic materials such as iron. The pins 5 are made of the same materials as connecting members 4. It will be appreciated that other materials such as aluminum, copper, and copper/zinc alloy may be used to fabricate the connecting members 4 and the pins 5. Alternatively, the connecting members 4 and the pins 5 may be made of iron and then plated with a chrome coating. In the preferred mode, each connecting member 4 has a width equal to or less than the width of the supporting member 1, and a length twice or less longer than the width of the supporting member 1. As illustrated, each connecting member 4 pivotally interconnects the adjacent supporting members 1 at two points through the two pins 5. As shown in FIGS. 1 and 2, the magnetic pole of one magnetic unit 3 has a sign different from that of the magnetic pole on the adjacent magnetic unit 3. As such, if the assembly is folded as shown in FIG. 3, a single magnet as a whole is formed. The numeral 6 denotes a chain assembly, one end 7 of which being preferably connected to one end of the supporting member 1 and the other end, designated as 8, of which being provided with an engaging member 9. Edges 10 of the supporting members 1 and surfaces 11 of the magnetic pieces 2 are dimpled (not shown) to prevent slippage. The numeral 12 denotes bushings.

In use, the assembly is spread as shown in FIGS. 1 and 2 from its folded position shown in FIG. 3. While a windshield cover (not shown) is placed over the windshield of the car, the assembly in its spread position is attached to a given window frame or vehicle body by virtue of magnetic force so as to secure the windshield cover thereto. Next, a given window glass is lowered so that the engaging member 9 is inserted. Thereafter, the window glass is closed and the car is locked. The opposite operation allows removal of the windshield cover from the windshield.

As shown in FIG. 3, the assembly is folded to form a single magnet as a whole. Accordingly, loss of magnetic force will be considered to be negligible, regardless of time. Preferably, the width of the magnetic piece 2 is the same as that of the supporting member 1, but it may be less than the width of the supporting member.

In the assembly thus made according to this invention, a plurality of magnetic units are formed in such a manner that the magnetic pieces are supported on the supporting members, each having a fixed width and length. These magnetic pieces are interconnected with each other by the connecting members, each connecting member having a width equal to or less than the width of the supporting member and a length twice or less longer than the width of same. A windshield cover can readily and detachably be secured to a vehicle body by spreading the assembly. Folding of the assembly brings the same into a compact arrangement, and thus it can conveniently be kept. Advantageously, the use of chain and engaging means may prevent the assembly from being stolen. The assembly does not require any cumbersome work on the vehicle body.

What is claimed is:

1. Anchor means for detachably securing a windshield cover to a vehicle body, comprising: a plurality of magnetic units each having a magnetic piece of the same size and configuration and each being of rectangular cross-sectional configuration; a pair of side members one extending along each of the sides of one of the magnetic units for supporting the magnetic unit; each of said side members being formed to have a width not greater than the width of said magnetic piece and a predetermined length longer than that of said magnetic piece with both of its ends projecting beyond the ends of the magnetic piece a predetermined distance; each of said magnetic units together with the side pieces associated therewith forming a link; a plurality of connecting members for pivotally interconnecting said links in tandem to form a flexible chain-like means by connecting the ends of each link to the end of an adjacent link, each connecting member being formed to have a width equal to or less than that of said links and a length not exceeding twice the thickness of said magnetic unit, said connecting members being of a length to permit said magnetic units to be folded to lay parallel to and in contatct with an adjacent magnetic unit.

2. The anchor means described in claim 1, wherein the magnetic polarity of a top surface of each of said magnetic units is the opposite of that of the top surfaces of the magnetic unit adjacent each of its ends.

3. The anchor means described in claim 1, wherein an anchor chain is provided at one end thereof said anchor chain being provided with an anchor member on its free end.

* * * * *